United States Patent [19]

Johnston et al.

[11] Patent Number: 4,840,366
[45] Date of Patent: Jun. 20, 1989

[54] IN-MOLD LABELING APPARATUS AND METHOD

[75] Inventors: Brian J. Johnston, York; Paul W. Klinedinst, Windsor, both of Pa.

[73] Assignee: Graham Engineering Corporation, York, Pa.

[21] Appl. No.: 90,237

[22] Filed: Aug. 27, 1987

[51] Int. Cl.[4] .............................................. B29C 49/24
[52] U.S. Cl. ........................................ 271/9; 425/503; 425/504; 264/509; 74/50; 74/110; 271/14; 271/102
[58] Field of Search ............... 425/503, 504, 537, 539; 264/509, 511; 271/4, 31.1, 11, 91, 102, 90, 107, 103; 74/50, 110, 25; 187/94; 414/719; 901/48

[56] References Cited

U.S. PATENT DOCUMENTS

| | | | |
|---|---|---|---|
| 3,324,508 | 6/1967 | Dickinson | 18/5 |
| 4,229,136 | 10/1980 | Panissidi | 414/719 X |
| 4,303,381 | 12/1981 | Aoki | 425/503 |
| 4,355,967 | 10/1982 | Hellmer | 264/509 X |
| 4,359,314 | 11/1982 | Hellmer | 425/503 |
| 4,397,625 | 8/1983 | Hellmer et al. | 264/509 X |
| 4,479,644 | 10/1984 | Bartimes et al. | 425/503 X |
| 4,479,770 | 10/1984 | Slat et al. | 425/503 |
| 4,479,771 | 10/1984 | Slat et al. | 425/503 |
| 4,527,942 | 7/1985 | Smith | 901/48 X |
| 4,540,460 | 9/1985 | Blomquist et al. | 156/571 |
| 4,549,863 | 10/1985 | Bourgeois | 425/126 |
| 4,563,148 | 1/1986 | Hasl et al. | 425/503 |
| 4,582,474 | 4/1986 | Ziegler | 425/504 X |
| 4,585,408 | 4/1986 | Darr | 425/171 |
| 4,595,449 | 6/1986 | Nowicki | 156/444 |
| 4,616,992 | 10/1986 | Oles | 425/503 |
| 4,636,166 | 1/1987 | Franks et al. | 425/504 X |
| 4,639,206 | 1/1987 | Darr | 264/509 X |
| 4,639,207 | 1/1987 | Slat et al. | 264/509 X |
| 4,679,997 | 7/1987 | Plenzler et al. | 264/590 X |
| 4,680,000 | 7/1987 | Nowicki et al. | 264/509 X |
| 4,708,630 | 11/1987 | Hammond | 264/509 X |
| 4,721,451 | 1/1988 | Darr | 425/503 |
| 4,769,205 | 9/1988 | Oles et al. | 264/509 |

OTHER PUBLICATIONS

Mechanisms, Linkages, and Mechanical Controls; Nicholas P. Chironis; 1965; p. 80, FIG. 2.
Jones, Ingenious Mechanisms, 1930, pp. 4, 6 and 7.

*Primary Examiner*—Joseph J. Rolla
*Assistant Examiner*—Stephen Parker
*Attorney, Agent, or Firm*—Thomas Hooker

[57] ABSTRACT

An in-mold labeling apparatus includes a label transfer assembly carrying a number of label carriages each with a number of label transfer heads. A continuously rotating drive arm raises and lowers the assembly in simple harmonic motion to move the label transfer heads between label magazines for pickup of labels and mold halves of a blow molding machine. Lost motion connections are provided at the top and bottom of the stroke to facilitate pickup of labels and placement of labels in the mold halves.

25 Claims, 6 Drawing Sheets

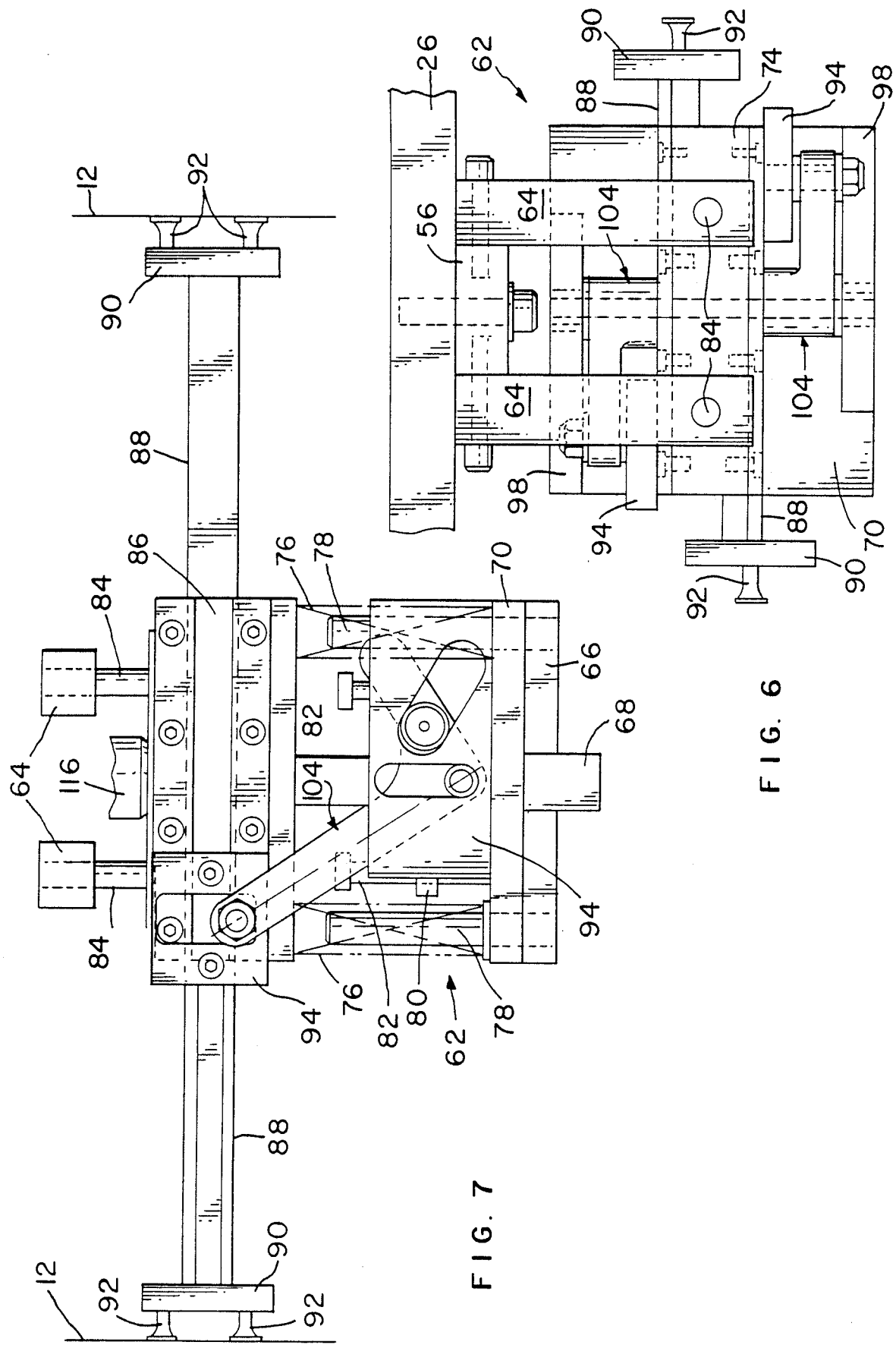

IN-MOLD LABELING APPARATUS AND METHOD

The invention relates to an improved in-mold labeling apparatus and method for picking up labels from label magazines and accurately and rapidly placing the labels in mold halves of a blow molding machine. After the labels are placed in the mold halves the mold halves close over a plastic parison and the parison is expanded within the closed cavity to form a container, conventionally a bottle. The labels are bonded to the expanded parison to form integral parts of the container.

Prior in-mold labeling apparatus, such as shown in U.S. Pat. No. 4,616,992 includes a first drive for extending and retracting label transfer heads for pick up of labels from magazines and placement of the labels in mold halves. A separate drive moves the label transfer heads in a direction perpendicular to the direction of extension and retraction to carry the labels from the magazines to the mold halves. Use of separate drives, frequently cylinder driven, is relatively slow and can subject the machine to shock and vibration at the end of the strokes. Separate drives require individual timing and control circuitry which increases the complexity of the machine. Use of a separate drive to move the label transfer heads through pick up and placement strokes means that these strokes are of equal length.

Other in-mold labeling devices uses rotary shaft drives. U.S. Pat. No. 4,479,770 discloses an in-mold labeling device of this type with a complicated drive mechanism having a production rate slower than the production rate of the blow molding machines used with the labeling device. The labeling device cannot be run at a higher rate because of the high inertial forces inherent in the design of the drive. As a result, the production rate of the blow molding machine is slowed to the rate at which the in-mold labeling device places labels in the molds and production is limited to the rate of the labeling device.

In the present improved in-mold labeling apparatus the motion of the label transfer heads is imparted by a single continuously and smoothly rotating arm. The arm moves a drive member around a circular second path and moves the drive member back and forth along a slot in a transverse follower. The follower raises and lowers a label transfer assembly along a first path in simple harmonic motion with gradual, smooth acceleration and deceleration. The assembly is preferably raised and lowered vertically. A counter balance assembly supports about 90 percent of weight of the label transport assembly, thereby reducing forces at the connection between the rotating arm and the cam to improve the smooth operation of the machine and enhance reliability of the apparatus.

Label carriages on the assembly include label transfer heads. The label carriages are smoothly decelerated to and from the label pick up position at one end of the stroke. As the assembly approaches the end of the stroke a lost motion connection collapses to extend the label transfer heads outwardly and into engagement with labels in magazines. At the very bottom of the stroke the extended label pick up heads dwell to permit accurate and reliable vacuum pick up of the labels. During the dwell period the label transfer heads are isolated from horizontal or vertical movement and do not move relative to the labels. As the continuously rotating arm begins to move the label transfer assembly toward the labeling position the lost motion connection expands and the label transfer heads and captured labels are retracted.

The carriages are moved slowly from the pick up position and then rapidly accelerated and decelerated during movement along the middle of the path to the labeling position where the carriages are positioned between mold halves. A lost motion connection is then collapsed to vertically dwell and extend and retract the label transfer heads through relatively long strokes to transfer the labels to the mold halves. Following retraction of the label transfer heads the carriages are returned along the path to the pick up station.

The drive arm rotates at a constant speed during the entire cycle of operation and imparts a simple harmonic motion to the label transfer assembly for high speed and reliable transfer of labels from fixed magazines to mold halves. The mold halves may be motionless or moving when labeled. The disclosed apparatus is capable of production speeds of 70 cycles per minute.

The in-mold labeling apparatus operates smoothly with reduced shocks and vibrations in comparison to other in-mold labeling apparatus where the label transfer heads are moved using air cylinders and mechanical drives. This smoothness of operation results in large part from use of a continuously rotating arm which imparts simple harmonic motion to the transport assembly. Maximum acceleration and deceleration occur when the carriages are away from the pick up and labeling positions and do not interfere with these operations. This feature permits high speed labeling and long term production reliability.

Other objects and features of the invention will become apparent as the description proceeds, especially when taken in conjunction with the accompanying drawings illustrating the invention, of which there are 8 sheets and one embodiment.

IN THE DRAWINGS

FIG. 6 is a top view of FIG. 4 taken generally along line 6—6 of FIG. 5;

FIG. 7 is a view like that of FIG. 4 taken at the top of the stroke with the label transport heads extended.

Figure 1:
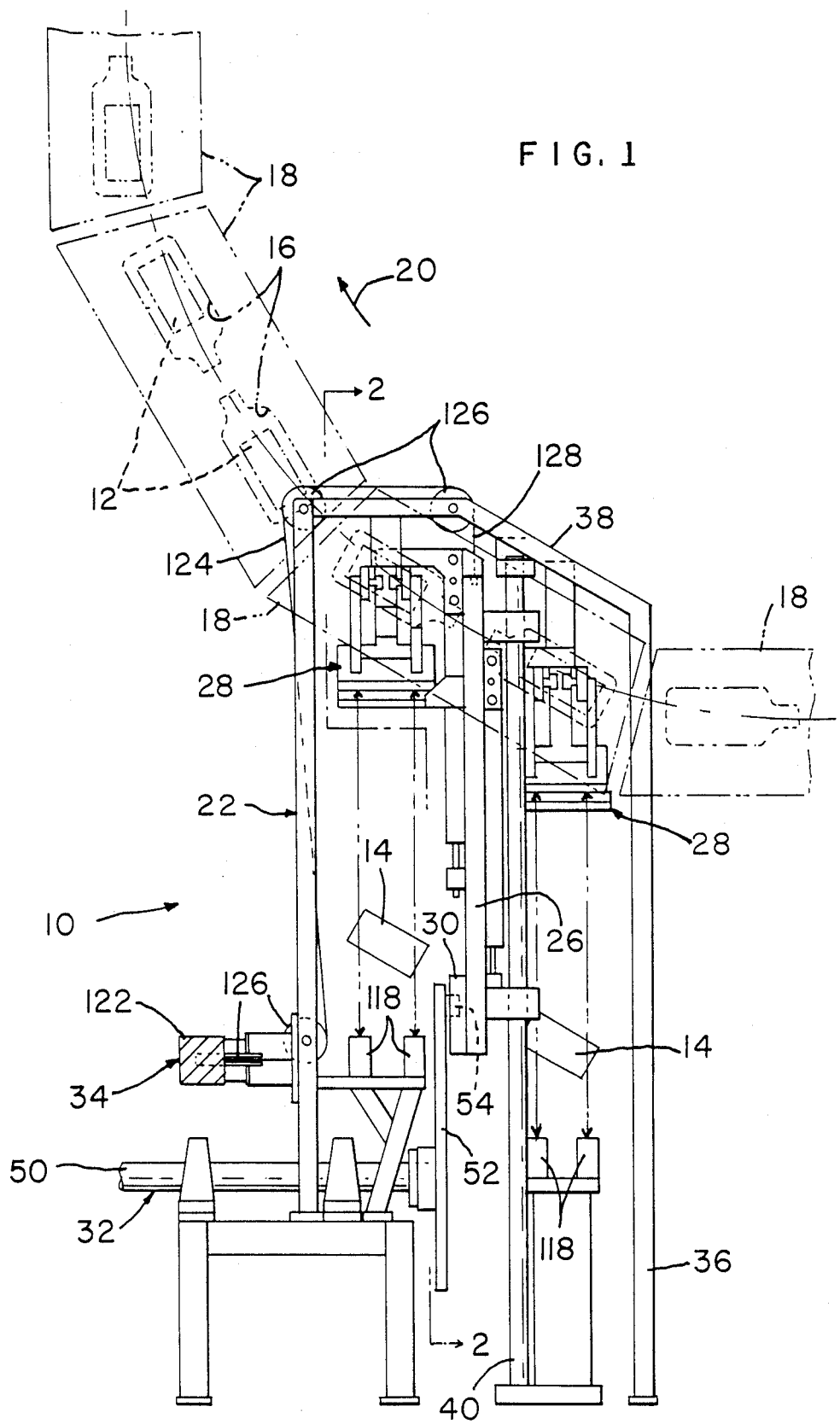
FIG. 1 is a side view of an in-mold labeling apparatus according to the invention.

In-mold labeling apparatus 10 picks up four labels 12 from magazines 14 and deposits the labels in the recesses 16 of opposed mold halves 18 of a continuously rotating blow molding machine (not illustrated). As illustrated in FIG. 1, the blow molding machine includes a number of paired mold halves 18 each having two mold recesses 16. All four recesses of each pair of mold halves are labeled during a cycle of apparatus 10. The in-mold labeling apparatus is located between the ejection and extrusion stations of the blow molding machine so that the mold halves are open as they rotate past the apparatus.

Apparatus 10 includes a frame 22; four label magazines 14 mounted on the frame; a label transport assembly 24 including a mounting plate 26, a pair of like label carriages 28 mounted on the upper end of the plate and a drive cam 30 on the lower end of the plate; a power drive 32 for raising and lowering the transport assembly and a counter balance assembly 34.

The lower end 36 of frame 22 is mounted on the base of the molding machine and the upper end 38 of the frame extends between the open mold halves 18 rotating past apparatus 10. A pair of spaced, parallel support rods 40 extend between the upper and lower ends of the frame. The rods extend through slide bearings 42 on plate 26 to permit vertical reciprocal motion of the label transport assembly along a straight path between label pick up and labeling positions.

Follower member 30 is mounted transversely on the lower end of plate 26 and includes a transverse cam slot 44 having two like straight sections 46 and 47 extending perpendicular to the rods 40 at the same level and a downwardly curved accelerator—dwell section 48 joining the inner ends of sections 46 and 47. Section 48 has a uniform radius of curvature.

The power drive 32 includes a continuously rotating shaft 50 journalled in bearings in the lower frame end 36. The shaft extends perpendicular to plate 26 and is located between the rods 40. A counter balanced arm 52 is secured on the end of shaft 50 and carries a cylindrical drive member or roller 54 on its outer end fitted within cam slot 44 so that rotation of shaft 50 moves the drive member around a continuous path and back and forth in the slot to raise and lower the label transport assembly 24 along a straight path. The radial length of the arm from the axis of the shaft to the center of the drive member is equal to the radius of curvature of slot dwell section 48.

Shaft 50 is connected to the power drive for the rotary blow molding machine so that arm 52 is rotated at a constant speed through repetitive 360 degree cycles during movement of mold halves past apparatus 10. Four labels are picked up from the magazines and placed in the four recesses of the mold halves as the mold halves move past the upper frame end 38.

The two label carriages 28 are mounted on opposite sides of the upper end of mounting plate 26. As shown in FIG. 1, the carriages are mounted at different heights on the plate 26 in order to assure proper alignment with the recesses in the mold halves 18. The pairs of magazines 14 are likewise located at different heights on the frame with the labels in the magazines tilted at an angle corresponding to the angle of the mold recesses during labeling. The carriages are alike so it is necessary to describe only a single carriage with the understanding that the description applies to both carriages.

Each label carriage 28 includes a mounting plate 56 suitably secured to plate 26. The mounting plate is vertically adjusted on the support plate by threaded shaft 58 and fixed block 60. Collapsible drive unit 62 is mounted on plate 56 between a pair of spaced upper arms 64 extending outwardly from the plate and a lower support plate 66 mounted on central arm 68 extending from plate 56. The unit 62 includes a lower plate 70 which normally rests flush on top of plate 66 and arm 68 and is movably secured to the plate 66 by rods 72 secured to plate 66 and extending upwardly through bores in and above plate 70 to allow vertical displacement of plate 70 above plate 66.

Slide block 74 is located on the top of the drive unit 62 and normally abuts the bottom of upper arms 64. Springs 76 are fitted over the ends of rods 72 and bias the slide block and plate 70 apart. A stop plate 80 extends down from the slide block toward plate 70. Bolts 82 are fitted smooth bores in plate 80 and threadably engage plate 70 to prevent separation of the drive units when removed from between fingers 64 and plate 66. A pair of guide pins 84 extend upwardly from the slide block 74 through smooth bores in the ends of arms 64.

The slide block 74 includes a transverse groove 86 on each side thereof with a slide bar 88 fitted in each groove. Each bar has a free end located outwardly of the block 74 with a label, transfer head 90 secured to the free end. Heads 90 are located on opposite end of the block 74. The heads each carry vacuum cups 92 for gripping and supporting labels. A cam plate 94 is attached to the inner end of each slide bar 88 and includes a vertical cam slot 96.

Figure 4:
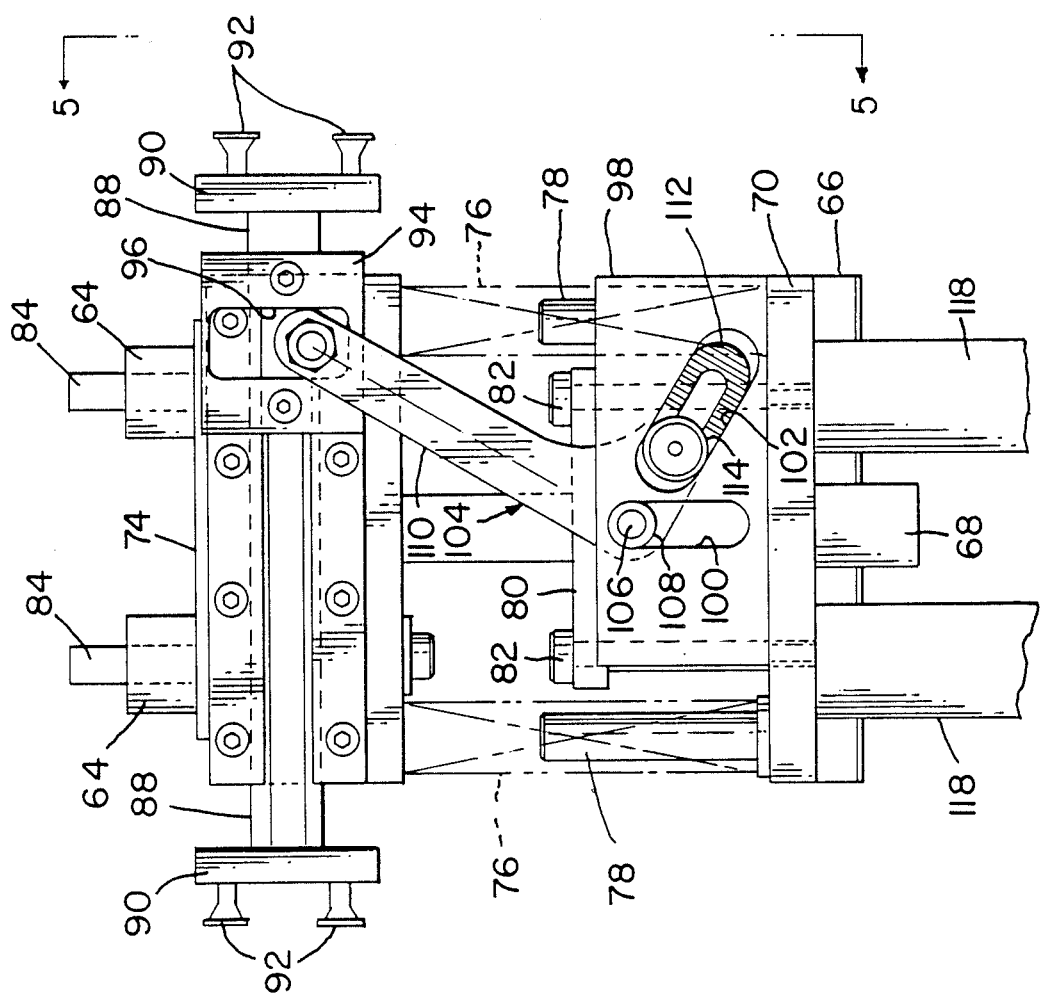
FIG. 4 is an enlarged view of one label carriage with the label transport heads retracted.

Vertical mounting plates 98 are secured on the inner and outer edges of plate 70. The plates each include a central aligned and vertically extending pivot slot 100 and an angled cam slot 102. As shown in FIG. 4, the slot 102 in the outer plate is located beneath the cam plate 94 for the outer slide bar. In the inner plate 98 the slot 102 is located on the opposite side of slot 100 and beneath the cam plate 94 for the inner slide bar.

Each collapsible drive unit 62 includes an L-shaped crank 104 for each slide bar 88. The crank for outer slide bar 88 as shown in FIG. 4 will be described with the understanding that the description applies equally well to the crank for the inner slide bar. Cranks 104 are mounted on pins 106, extending from the plate 80 and into the vertical slots 100. The pins move up and down with the side bar 74. Rollers 108 on the pins have a working fit in the slots 100.

The long upper arm 110 of crank 104 carries a roller (not illustrated) fitted in slot 96 of the adjacent cam plate 94. The lower short crank arm 112 carries a roller 114 fitted within slot 102. As shown in FIG. 4, arm 112 is slotted and is provided with grooves permitting adjustable mounting of roller 114 on the arm to vary the effective length of the arm and thereby adjust the transverse stroke of the slide bar 88 as required.

A pair of stops 116 are adjustably mounted on the upper end of frame 26 to engage the top of the drive units when the assembly 24 is raised to the labeling position. Four fixed stop blocks 118 are located on the lower end of the frame beneath each drive unit and engage lower plate 70 when assembly 24 is lowered to the pick up position. Stop blocks 118 pass to either side of plate 66.

Figure 2:
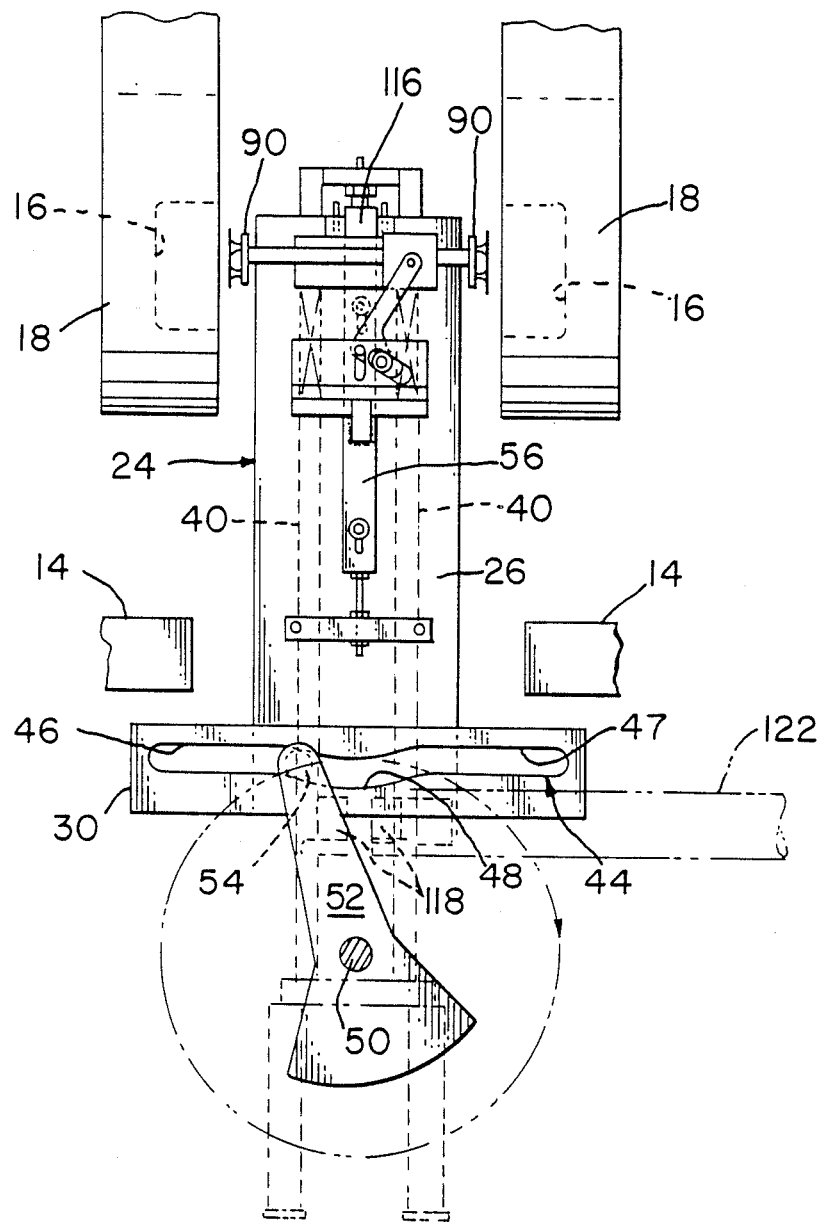
FIG. 2 is a view taken generally along line 2—2 of FIG. 1.

The counter balance assembly 34 includes an air cylinder 122 partially illustrated in FIGS. 1 and 2 having a piston rod attached to support cable 124. The cable is led from the rod around a number of pulleys 126 mounted on the frame so that the cable end 128 away from cylinder 122 extends downwardly and is connected to the upper end of the mounting plate 26. See FIG. 1. During operation of in-mold labelling apparatus 10, cylinder 122 is supplied with air of sufficient pressure to assure the cable 124 supports approximately 90 percent of the weight of the label transport assembly 24. The cylinder has sufficient stroke to accommodate the raising and lowering of the assembly along the straight path extending between the pick up and labeling positions. Support of the transport assembly by cylinder 122 reduces loading forces and wear at roller 54.

The follower 30, slide bars 88, cam plates 94, mounting plates 98, stops 116 and stop blocks 118 may all be manufactured from a stiffly flexible and wear resistant plastic material such as nylon.

The operation of in-mold labeling apparatus 10 will now be described, starting at the position shown in FIG. 4 where rotation of arm 54 has lowered the label transport assembly 24 to the pick up position so that the plates 70 of the two drive units 28 are in their lowermost position and are each in contact with the associated four stop blocks 118. In this position the continuously rotating drive member 54 on the end of arm 52 is moving inwardly along the inner end of transverse cam slot 47 adjacent the right hand end of the accelerator—dwell section 48. Plates 26 and 56 and arms 64 and 68 are being lowered. Lowering of arms 64 lowers the slide block 74 and pins 106 carrying the cranks 104 so that rollers 114 are forced against the lower sides of slots 102, the cranks are rotated correspondingly and the rollers on the free ends of arms 110 shift in slots 96 to extend the slide bars 88 and the transfer heads 90 on the ends of the bars. After plates 70 contact stops 118 the follower 54 moves only a short distance inwardly along the slot 47 before entering the accelerator—dwell section and, accordingly, extends the slide bars on a short distance sufficient to move the heads 90 outwardly and into engagement with labels carried by adjacent magazines 14. Upon contact with the labels vacuum applied to heads 92 regenerates to secure the labels to the heads by vacuum connection.

The slide bars and heads are moved downwardly with arms 64 as they are extended and cups 92 engage the labels. Once the heads are extended into contact with the labels presented in the magazines the member 54 moves from cam section 47 into the downwardly curved inner accelerator-dwell section 48. This section has the same effective radius as arm 52 so that during movement of the follower through section 48 the plates 2 and 56 and arms 64 dwell in the same vertical position with the heads 90 and cups 92 are vertically and horizontally dwelled or motionless adjacent the labels presented in magazines 14. This dwell period allows vacuum to increase within heads 92 for forming a reliable vacuum connection between the heads and the labels. The connection holds the labels in proper position on the heads. Such connections are important in order to assure that the labels are reliably and accurately placed in the mold halves.

Figure 3:
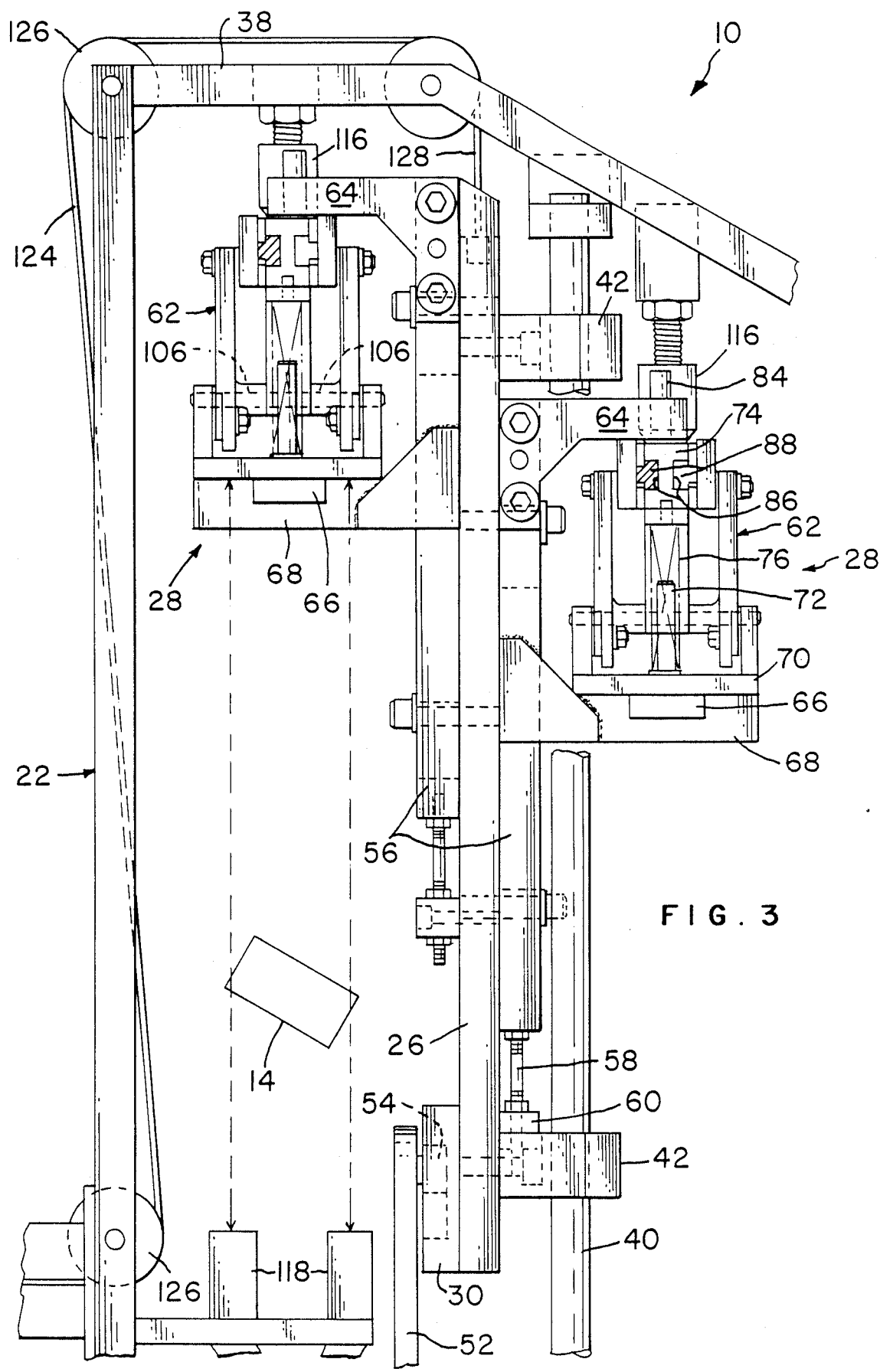
FIG. 3 is an enlarged view of the upper portion of FIG. 1.
Figure 5:
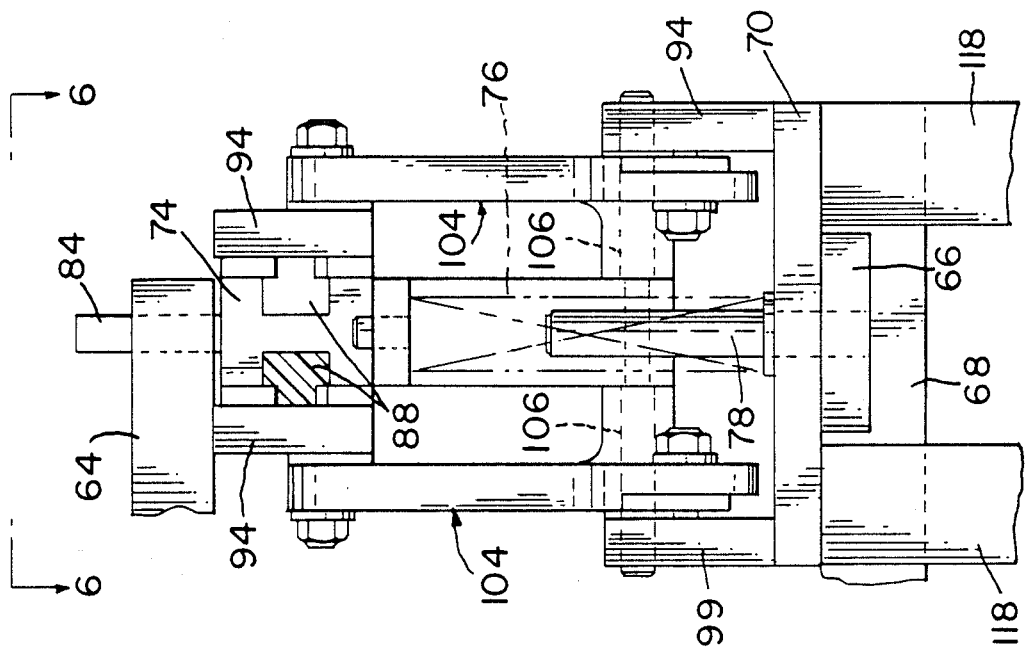
FIG. 5 is a view taken generally along line 5—5 of FIG. 4.
Figure 8A:
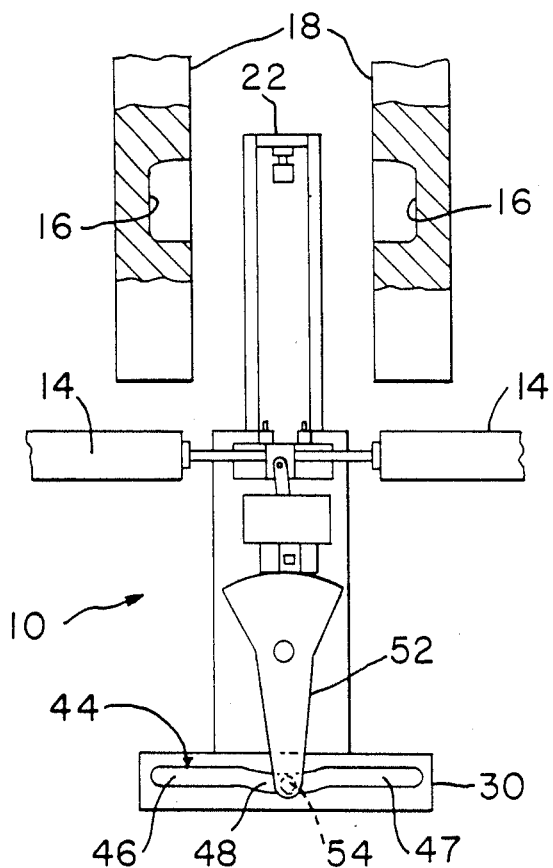
FIGS. 8A–8C are diagrammatic views illustrating a cycle of operation of the in-mold labeling apparatus.
Figure 8B:
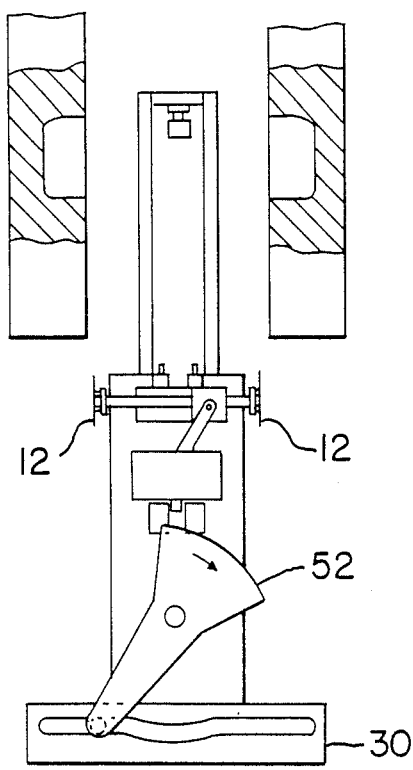
Figure 8C:
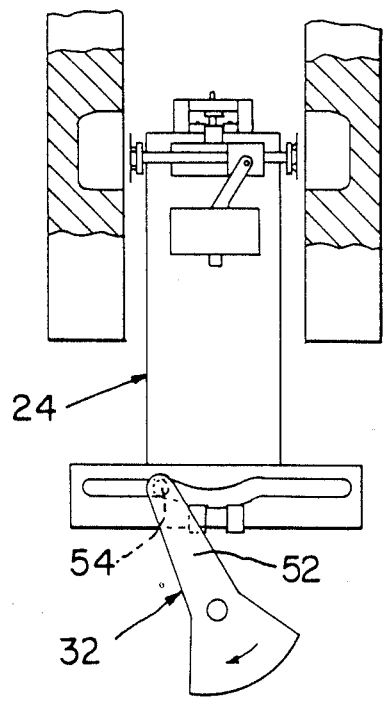

FIG. 8A diagrammatically illustrates the position of the in-mold labeling apparatus 10 when the follower 54 is in the center of the accelerator—dwell section of the cam slot and the heads and cups dwell against the labels in magazines 14. Further rotation of arm 52 moves the member 54 out of section 48 and into the straight left-hand section 46. Upon entry into this section the follower raises plates 26 and 56 and arms 64 and 68 thereby allowing the collapsed drive units 62 to be expanded by springs 76 as the slide blocks 74 are raised above the lower plates 70. This movement causes the cranks 104 to rotate and retract the slide bars 88, heads 90 and labels 12 carried by the vacuum cups 92. When the label carriers are fully expanded plate 66 and arm 68 pick up the lower plate 70 so that further upward movement of the mounting plate 26 raises the fully expanded drive units and labels along the straight first path up from the pick up position of FIG. 8B to the labeling position of FIG. 8C. During this time member 54 sweeps outwardly along the length of cam section 46 and returns inwardly along the same section to the beginning of the accelerator—dwell section 48 and the label carriages 28 with retracted label transfer heads are in the position shown in FIGS. 2, 3 and 8C with the slide blocks 74 engaging a number of stops 116. The rate of upward movement along the first path is greatest when the drive member moves through the outer portion of cam section 46. The label carriers are brought into relatively gentle contact with the stops 116 as the retracted label transfer heads and labels are moved into the space located between the open mold halves of the rotary blow molding machine moving from the ejection station to the extrusion station.

Figure 8D:
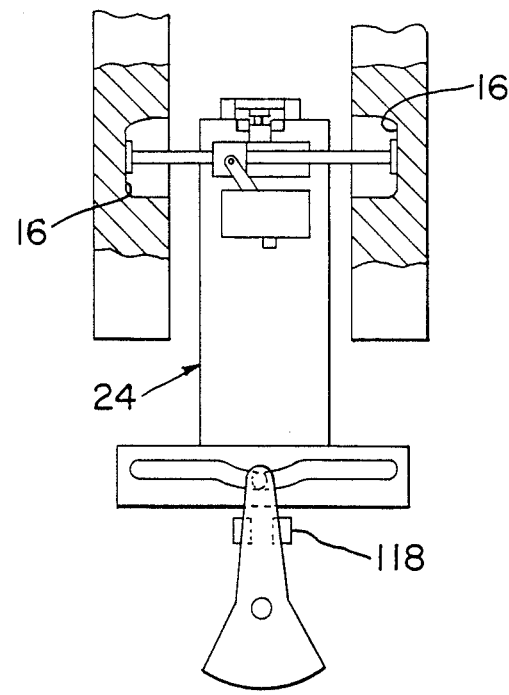

Following raising of the label carriages to the labeling position as described the member 54 is moved through the downwardly curved accelerator—dwell section 48 thereby rapidly raising the arms 68 and plates 66 against plates 70 while stops 116 prevent further upward movement of the slide blocks 74. This rapid collapse of the drive units rapidly rotates the cranks 10 to rapidly extend the slide bars, heads, cups and supported labels to the positions of FIGS. 7 and 8d, thereby positioning the labels in proper positions within the mold recesses 16 as the mold halves rotate past apparatus 10. Suitable vacuum manifolds in the mold halves (not illustrated) provide a vacuum connection between the labels and the mold halves upon extension of the label transfer heads. At the same time, the vacuum applied to cups 92 is relieved thereby permitting transfer of the labels to the mold recesses. Full extension of the heads for label transfer occurs when the drive member 54 is at the center of the accelerator—dwell cam section 48 as shown in FIG. 8d. Continued rotation of the arm 52 and member 54 rapidly withdraws the slide bars and label transfer head from within the mold cavities to assure that there is no interference between the heads and the rotating mold halves.

The label transfer heads are vertically dwelled during extension and retraction of the labeling position. During movement of follower through the accelerator—dwell section of cam slot 44 arms 64 are raised and lowered relative to the vertically fixed slide block 74 and the slide blocks are maintained in proper orientation by guide pins 84. See FIG. 7.

When the member 54 reaches the end of the accelerator—dwell section 48 the drive units are again expanded and confined between arms 64, arms 68 and plate 66 and the label transfer heads and slide bars are retracted as shown in FIG. 4. The continuously rotating drive member moves into the straight cam section 47 and the entire label transport assembly is lowered along the first path from the labeling position and returned to the pick up position of FIG. 4, following which the cycle of operation is repeated.

An in-mold labeling apparatus 10 with an arm 52 having an effective radius of slightly greater than 9 inches rotation of the arm moves the drive member around a continuous circular second path and raises and lowers the label transport assembly along a straight first path approximately 18 inches long during each cycle of operation. This machine may be run at a production rate of 70 cycles per minute to transfer 280 labels per minute to cavities in continuously rotating molds of the blow molding machine. The blow molding machine produces 140 doubled labeled bottles per minute.

The specialized cam drive and counter balance assembly contribute to the high operating speed of apparatus 10. High speed operation allows the blow molding machine to run at a faster rate with increased production greater than the production of blow molding machines using conventional in-mold labeling devices.

The rotary simple harmonic motion drive slowly decelerates and accelerates the transport assembly at the pick up and labeling positions where it is necessary to control movement of the assembly accurately. The highest acceleration and deceleration forces are exerted on the label transfer assembly during the middle of the raising and lowering paths remote from the pick up and labeling position where control is not critical.

Accuracy of label pick up is attained by vertically and horizontally dwelling the extended label transfer heads at the pick up station. Accurate label placement in mold halves is attained by vertically dwelling the label transfer heads during placement in the mold halves. The heads are extended and retracted along the same path while vertically dwelled to prevent hitting the sides of the mold halves.

As illustrated in FIGS. 2 and 8A-8D, the extension and retraction stroke of the label transfer heads during label pick up are appreciably shorter than the extension and retraction strokes during placement of labels in the moving mold halves. The reduced stroke during label pick up makes it is possible to dwell the label transfer heads on the labels in the magazines for a period of time to improve the vacuum pick up connection and the accuracy with which the labels are held on the heads. The extension and retraction strokes at both the pick u and discharge locations may be independently varied by adjusting the locations of stops 116 and stop blocks 118 and the geometry of the slot in drive cam 30.

While we have illustrated and described a preferred embodiment of our invention, it is understood that this is capable of modification, and we therefore do not wish to be limited to the precise details set forth, but desire to avail ourselves of such changes and alterations as fall within the purview of the following claims.

What we claim as our invention is:

1. An in-mold labeling apparatus comprising
   (a) a label transport assembly movable along a first path extending between a label pick up position and a labeling position, the assembly having
      i. a label transfer head,
      ii. a label pick up means on the head, and
      iii. a follower member;
   (b) a power drive for the label transport assembly, the power drive having
      i. a drive member, and
      ii. a power drive means for continuously moving the drive member repetitively around an endless second
   (c) connection means joining the drive member directly to the follower moving the label transport assembly back and forth the first path only as the drive member is moved around the second and
   (d) label transfer head drive means for extending and retracting the label transfer head at the label pick up position and at labeling position
   (e) whereby during each cycle of movement of the drive member around the second path the label transfer assembly is moved back and forth between the label pick up and labeling positions and the label transfer head is extended and retracted to pick up a label at the pick up position, carry the label to the labeling position and place the label in a mold half and return to the pick up position.

2. Apparatus as in claim 1 wherein said second path is circular.

3. Apparatus as in claim 1 wherein the power drive includes a rotary shaft and a radial arm on the shaft, said drive member being mounted on the arm away of the shaft.

4. Apparatus as in claim 3 wherein said connection means includes a slot in the follower member extending generally transversely to the first path, said drive member being fitted in the slot.

5. Apparatus as in claim 4 wherein a portion of the slot has a radius of curvature equal to the radius of the second path.

6. Apparatus as in claim 3 wherein the connection means includes dwell means for at least partially dwelling movement of the label transfer head along the first path when at the pick up position.

7. Apparatus as in claim 3 wherein the connection means includes accelerating means for accelerating movement of the label transfer head along the first path when at the labeling position.

8. Apparatus as in claim 1 wherein the label transfer head drive means includes first means for extending and retracting the label transfer head at the labeling position at a rate proportional to the rate of movement of the label transport assembly toward and away from such position, and the connection means includes accelerator means for accelerating the assembly along the first path at the labeling position so that the label transfer head is more rapidly extended and retracted at the labeling position than at the pick up position.

9. Apparatus as in claim 8 wherein said accelerator means also slows extension and retraction of the label transfer head when at the pick up position.

10. Apparatus as in claim 1 including a first stop at the pick up position and a second stop at the labeling position, said stops being located in the path of movement of the label transport assembly, such assembly including a first member facing the first stop, a second member facing the second stop and a mechanism joining said members and the label transfer head for extending and retracting the label transfer head upon movement of said members toward and away from each other, whereby movement of the label transport assembly toward and away from the pick up position brings the first member into and out of engagement with the first stop to extend and retract the label transport head for label pick up and movement of the label transport assembly toward and away from the labeling position brings the second member into and out of engagement with the second stop to extend and retract the label transfer head for placement of the carried label in a mold recess.

11. Apparatus as in claim 10 where said second stop moves the members closer together than the first stop.

12. Apparatus as in claim 10 wherein said first and second member s are confined between opposed arms on the label transport assembly and including a spring normally biasing said members into engagement with the arms.

13. Apparatus as in claim 1 wherein the second path has a vertical component and including counter balance means supporting the label transfer assembly during movement along the first path.

14. Apparatus as in claim 13 wherein said counter balance means includes a fluid cylinder and a support connection between the cylinder and the label support assembly, the cylinder being pressurized to support part of the weight of the label transport assembly.

15. An in-mold labeling apparatus comprising:
   a. a label transport assembly including a label transfer head, a first member, a second member and a mechanism joining said members and the label transfer head for extending and retracting the label transfer heat in response to movement of the members toward and away from each other;
   b. a drive for moving the label transport assembly between a label pick up position and a labeling position; and
   c. a first stop located adjacent the label pick up position in the path of movement of the first member and a second stop adjacent the labeling position in the path of movement of the second member;
   d. whereby movement of the label transport assembly toward and away from the pick up position brings the member into and out of engagement with the first stop to extend and retract the label transport head for label pick up and movement of the label transport assembly toward and away from the labeling position brings the second member into and out of engagement with the second stop to extend and retract the label transport head for placement of a carried label in a mold recess.

16. An apparatus as in claim 15 wherein said second stop moves the members closer together than the first stop.

17. An apparatus as in claim 15 wherein the label transport assembly includes a pair of opposed arms, said mechanism being confined between the arms and including spring means for normally biasing said member into engagement with the arms.

18. An apparatus as in claim 17 wherein said mechanism includes an arm pivotedly joined to and extending between one member and the label transfer head, and means for rotating the arm responsive to movement of said members toward and away from each other to extend and retract the label transfer head.

19. An apparatus as in claim 18 wherein said means for rotating the arm includes a cam surface on said one member, a follower on the arm engagable with the cam surface and a sliding pivot connection between the ar and said one member.

20. Apparatus as in claim 15 wherein said drive includes a rotary shaft, a radial arm on the shaft, a drive member on the arm and a connection between the member and the transport assembly so that the drive moves the assembly back and forth along a path between the positions.

21. The method of placing labels in molds of a blow molding machine by the steps of:
   (a) repetitively moving a drive member directly connected to a follower member of a label transport assembly around a continuous first path to move the assembly back and forth along a second path between a label pick up position and a labeling position;
   (b) extending a label transfer head in the assembly when at the pick up position to engage a label and then retracting the label transfer head and held label;
   (c) dwelling movement of the label transfer head relative to the label for an interval during engagement with the label and during pick up of the label; and
   (d) extending the label transfer head when at the labeling position to move the held label into a recess in one mold half, transferring the label to the mold half and retracting the label transfer heat.

22. The method of claim 21 including the step of moving the drive member around a circular first path.

23. The method of claim 21 including the step of extending and retracting the label transfer head at the labeling position faster than at the pick up position.

24. The method of claim 23 including the step of dwelling movement of the label transfer head along the second path during extension, pick up and retraction at the labeling position.

25. The method of claim 24 including the step of extending and retracting the label transfer head a greater distance at the pick up position than at the labeling position.

* * * * *

UNITED STATES PATENT AND TRADEMARK OFFICE
CERTIFICATE OF CORRECTION

PATENT NO. : 4,840,366

DATED : June 20, 1989

INVENTOR(S) : Brian J. Johnston et al

It is certified that error appears in the above—identified patent and that said Letters Patent is hereby corrected as shown below:

In the Specification:

Column 1, line 29, change "uses" to --use--.

Column 2, line 55, change "8A--8C" to --8A--8D--.

Column 4, line 60, change "labelling" to --labeling--.

Column 5, line 39, change "2" to --26--.

Column 6, line 20, change 10 to --104--; and lines 22 and 33, change "8d" to --8D--.

Column 7, line 29, change "u" to --up--.

In the Claims:

Column 7, lines 53 and 57 insert --path;-- after "second"; and line 60 insert --the-- before "labeling".

Column 8, line 58, delete "member s" and insert --members--.

Column 9, line 19, insert --first-- before "member"; and line 33, delete "member" and substitute --members--.

Column 10, line 1, delete "ar" and substitute --arm--;

UNITED STATES PATENT AND TRADEMARK OFFICE
CERTIFICATE OF CORRECTION

PATENT NO. : 4,840,366
DATED : June 20, 1989
INVENTOR(S) : Brian J. Johnston et al It is certified that error appears in the above-identified patent and that said Letters Patent is hereby corrected as shown below:

and line 29, delete "heat" and substitute --head--.

Signed and Sealed this

Twenty-fourth Day of April, 1990

Attest:

HARRY F. MANBECK, JR.

*Attesting Officer*          *Commissioner of Patents and Trademarks*